United States Patent
Ng et al.

(10) Patent No.: US 9,582,474 B2
(45) Date of Patent: Feb. 28, 2017

(54) METHOD AND APPARATUS FOR PERFORMING A FFT COMPUTATION

(71) Applicant: INTERNATIONAL BUSINESS MACHINES CORPORATION, Armonk, NY (US)

(72) Inventors: Hoi Sun Ng, Zurich (CH); Jan Van Lunteren, Gattikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 262 days.

(21) Appl. No.: 14/313,132

(22) Filed: Jun. 24, 2014

(65) Prior Publication Data
US 2015/0006604 A1    Jan. 1, 2015

(30) Foreign Application Priority Data
Jul. 1, 2013  (GB) .................................. 1311786.6

(51) Int. Cl.
    *G06F 17/14*       (2006.01)
(52) U.S. Cl.
    CPC .................. *G06F 17/142* (2013.01)
(58) Field of Classification Search
    CPC .............................. G06F 17/14; G06F 17/142
    See application file for complete search history.

(56) References Cited

U.S. PATENT DOCUMENTS 6,609,140 B1    8/2003    Greene 6,718,356 B1 *  4/2004    Rosner .................. G06F 17/142
                                                   708/404

(Continued)

FOREIGN PATENT DOCUMENTS

WO    WO 2005/086020 A2    9/2005

OTHER PUBLICATIONS

Zhang, Qin et al., "A Novel Address Mapping Scheduling Strategy for Continuous Flow Parallel FFT Implementation", Proceedings of the International Conference on Parallel and Distributed Processing Techniques and Applications & Conference on Real-Time Computing Systems and Applications, Jun. 2006, vol. 2, PDPTA 2006.

(Continued)

*Primary Examiner* — Chuong D Ngo
(74) *Attorney, Agent, or Firm* — Cantor Colburn LLP; Mercedes Hobson

(57) ABSTRACT

A method, apparatus, and computer program product for performing an FFT computation. The method includes: providing first and second input data elements in multiple memory areas of a memory unit; in each of a number of consecutive computation stages, performing multiple butterfly operations based on a first and second input data element to obtain two output data elements, wherein first and second input data elements for a plurality of multiple butterfly operations are simultaneously retrieved from predetermined memory locations of a first and second of memory areas; for each stage, storing two output data elements in the memory unit as input data elements for a next stage according to a mapping scheme configured to store output data elements at memory locations in first and second memory areas so that they are simultaneously retrievable as input data elements for a plurality of butterfly operations of subsequent computation stage.

14 Claims, 12 Drawing Sheets

(56) References Cited

U.S. PATENT DOCUMENTS

| | | | |
|---|---|---|---|
| 7,062,523 B1 | 6/2006 | Hoffman et al. | |
| 7,233,968 B2* | 6/2007 | Kang | G06F 17/142 708/404 |
| 7,395,293 B1 | 7/2008 | Szedo et al. | |
| 8,364,736 B2 | 1/2013 | Lee et al. | |
| 2005/0256917 A1 | 11/2005 | Harley | |
| 2009/0172062 A1 | 7/2009 | Tang et al. | |
| 2009/0313314 A1 | 12/2009 | Mundarath et al. | |
| 2010/0174769 A1* | 7/2010 | Modlin | G06F 17/142 708/404 |
| 2010/0179978 A1 | 7/2010 | Halvarsson | |
| 2014/0192855 A1* | 7/2014 | Yomo | G06F 17/142 375/232 |

OTHER PUBLICATIONS

Shafirulla, G et al., "Design of High Speed FFT Processor Based on FPGA", International Journal of Modern Engineering Research (IJMER), May-Jun. 2012, pp. 657-660, vol. 2, Issue 3.

* cited by examiner

|   |   |   |   |
|---|---|---|---|
| 7 | IDE 28 | IDE 29 | IDE 30 | IDE 31 |
| 6 | IDE 12 | IDE 13 | IDE 14 | IDE 15 |
| 5 | IDE 20 | IDE 21 | IDE 22 | IDE 23 |
| 4 | IDE 4  | IDE 5  | IDE 6  | IDE 7  |
| 3 | IDE 24 | IDE 25 | IDE 26 | IDE 27 |
| 2 | IDE 8  | IDE 9  | IDE 10 | IDE 11 |
| 1 | IDE 16 | IDE 17 | IDE 18 | IDE 19 |
| 0 | IDE 0  | IDE 1  | IDE 2  | IDE 3  |

|   |   |   |   |   |
|---|---|---|---|---|
| 3 | TF 12 | TF 13 | TF 14 | TF 15 |
| 2 | TF 8  | TF 9  | TF 10 | TF 11 |
| 1 | TF 4  | TF 5  | TF 6  | TF 7  |
| 0 | TF 0  | TF 1  | TF 2  | TF 3  |

Fig. 3

| | | | |
|---|---|---|---|
| 7 | IDE 28 | IDE 29 | IDE 30 | IDE 31 |
| 6 | IDE 12 | IDE 13 | IDE 14 | IDE 15 |
| 5 | IDE 20 | IDE 21 | IDE 22 | IDE 23 |
| 4 | IDE 4 | IDE 5 | IDE 6 | IDE 7 |
| 3 | IDE 24 | IDE 25 | IDE 26 | IDE 27 |
| 2 | IDE 8 | IDE 9 | IDE 10 | IDE 11 |
| 1 | IDE 16 | IDE 17 | IDE 18 | IDE 19 |
| 0 | IDE 0 | IDE 1 | IDE 2 | IDE 3 |

IDE 28-31: 11100-11111b -> bit reverse 111 = 111b (7)
IDE 12-15: 01100-01111b -> bit reverse 011 = 110b (6)
IDE 20-23: 10100-10111b -> bit reverse 101 = 101b (5)
IDE 4-7:   00100-00111b -> bit reverse 001 = 100b (4)
IDE 24-27: 11000-11011b -> bit reverse 110 = 011b (3)
IDE 8-11:  01000-01011b -> bit reverse 010 = 010b (2)
IDE 16-19: 10000-10011b -> bit reverse 100 = 001b (1)
IDE 0-3:   00000-00011b -> bit reverse 000 = 000b (0)

Fig. 4

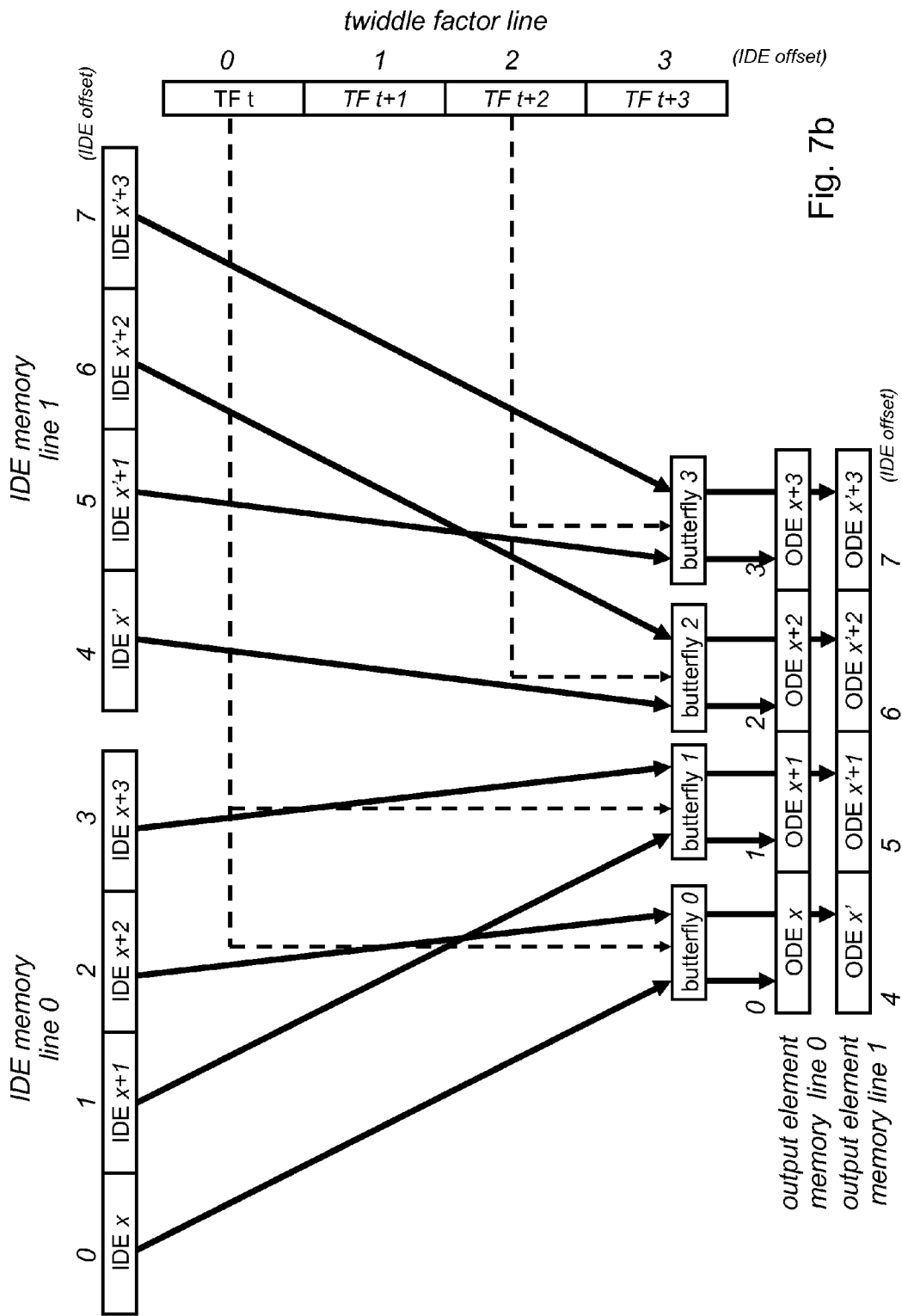

|   | | | | |
|---|---|---|---|---|
| 7 | IDE 7 | IDE 23 | IDE 15 | IDE 31 |
| 6 | IDE 5 | IDE 21 | IDE 13 | IDE 29 |
| 5 | IDE 6 | IDE 22 | IDE 14 | IDE 30 |
| 4 | IDE 4 | IDE 20 | IDE 12 | IDE 28 |
| 3 | IDE 3 | IDE 19 | IDE 11 | IDE 27 |
| 2 | IDE 1 | IDE 17 | IDE 9 | IDE 25 |
| 1 | IDE 2 | IDE 18 | IDE 10 | IDE 26 |
| 0 | IDE 0 | IDE 16 | IDE 8 | IDE 24 |

|   | | | | |
|---|---|---|---|---|
| 3 | TF 12 | TF 13 | TF 14 | TF 15 |
| 2 | TF 8 | TF 9 | TF 10 | TF 11 |
| 1 | TF 4 | TF 5 | TF 6 | TF 7 |
| 0 | TF 0 | TF 1 | TF 2 | TF 3 |

Fig. 8

METHOD AND APPARATUS FOR PERFORMING A FFT COMPUTATION

CROSS-REFERENCE TO RELATED APPLICATION

This application claims priority under 35 U.S.C. §119 from Patent Application No. GB1311786.6 filed Jul. 1, 2013, the entire contents of which are incorporated herein by reference.

BACKGROUND OF THE INVENTION

1. Field of the Invention

The present invention generally relates to the field of Fast Fourier Transform (FFT) computation, in particular, to a memory mapping scheme for FFT processing using butterfly operations.

2. Description of the Related Art

The Fast Fourier Transform (FFT) is considered one of the most important algorithms in signal processing and allows for efficient conversions of separate functions from the time domain to the frequency domain and vice versa. This is essential for a wide range of applications.

The calculation of FFT processes is computationally intensive and can require a substantial amount of memory space as well as memory communication bandwidth. The basic operation in the FFT is known as the butterfly operation. Computing the butterfly operation requires a total of five memory accesses, i. e. two data loads, one twiddle load and two data stores. The operations to be performed include one in multiplication and two additions performed on complex numbers.

The fact that processor speeds have increased at a much faster rate than memory speeds has rendered the memory accesses the bottleneck of those kinds of FFT operations. Hence, it is a challenge to transfer the required data to the processing unit in time in order to avoid stalls. In current state-of-the-art solutions this is handled by means of prefetching, prediction and caching.

Document U.S. Pat. No. 8,364,736 B2 discloses a method for calculating an FFT computation, wherein the FFT computation is decomposed into partial FFT computations of smaller size and then transforms the original index from one dimension into a multi-dimensional vector. By controlling the index factor, the input data can be distributed to different memory banks such that the multi-bank memory for high-radix structures can be supported simultaneously without memory conflicts.

Document U.S. Pat. No. 7,395,293 B1 discloses a method for performing an FFT computation of N input data elements using a radix-K decomposition of the FFT. N/K input data elements are written into respective ones of K addressable memory locations and $N/K \times \log_K N$ passes are performed on the input data. Each pass includes reading K data elements in parallel from the K addressable memory locations using the generated addresses, wherein the K data elements are in a first order corresponding to the respective memories. The first order of K data elements is permuted into a second order of K data elements and a radix-K calculation on the second order of K data elements is performed. This results in corresponding result data elements in the second order. The second order of K result data elements is permuted into the first order and the K result data elements are written in parallel into the corresponding K addressable memory locations using the respective addresses.

Document US 2005/025 6917 A1 describes a method for performing a FFT computation. The method facilitates the identification of computationally efficient patterns for sequentially generating a unique set of bit-reversed address pairs.

Document WO 2005/086020 A2 discloses an FFT circuit for performing an FFT computation, wherein the FFT circuit is implemented using a radix-4 butterfly element and a partitioned memory for storing a prescribed number of data values. The radix-4 butterfly element is configured to perform an FFT operation in a prescribed number of stages, each stage including a prescribed number of in-place computation operations relative to the prescribed number of data values. The partitioned memory has memory portions for storing parts of the data values, so that each in-place computation operation is based on the retrieval of an equal number of data values retrieved from each of the memory portions.

Document U.S. Pat. No. 7,996,453 discloses a method for performing an FFT computation wherein FFT butterfly data sets are stored in memory in a predetermined order. Such an order can allow a butterfly data set to be read from a single memory address location. The memory addressed is computed by an address rotary function depending on the butterfly and stage of the FFT. Addressing the memory in such a manner allows each butterfly data set of a subsequent FFT stage to be stored to a single memory location. Shuffle registers are provided to delay the writing of FFT butterfly results to the memory until most of the data corresponding to a particular butterfly operation has been computed. The shuffle registers are configured to rearrange and to combine the results of one or more butterfly operations in a different manner from which they have been computed. Combining the results in this manner allows a subsequent FFT stage to access data by addressing a single memory location.

Document Zhang Q., Han J., Han C., "A novel address mapping scheduling strategy for continuous flow parallel FFT implementation", Proceedings of the International Conference on Parallel and Distributed Processing Techniques and Applications & Conference on Real-Time Computing Systems and Applications, June 2006, Volume 2, PDPTA 2006, discloses a continuous flow parallel FFT processor that uses an address mapping scheduling strategy. Four parallel butterfly computation units are provided to enhance the throughput. The address mapping scheduling strategy uses only two memory units for a continuous flow parallel FFT implementation, thereby reducing the utilization of memory resources. The non-conflict address mapping approach ensures the parallel computation of four butterfly units in one clock cycle and the execution of the address mapping scheduling strategy.

It is an object of the present invention to provide another method for performing an FFT computation, in particular, a method which allows for an efficient use of memory resources and contributes to an increased FFT computation speed.

BRIEF SUMMARY OF THE INVENTION

The present invention provides a method for performing a FFT computation, including: providing first and second input data elements in multiple memory areas of a memory unit; n each of a number of consecutive computation stages, performing multiple butterfly operations, each based on a first input data element and a second input data element, to obtain two output data elements, wherein the first and second input data elements for a plurality of the multiple butterfly operations are each simultaneously retrieved from predetermined memory locations of a first and second memory areas of the memory unit; and or each of the computation stages, storing the two output data elements in the memory unit as input data elements for a next computation stage according to a mapping scheme, wherein the mapping scheme is configured to store the output data elements at memory locations in the first and second memory areas, so that they are simultaneously retrievable as input data elements for a plurality of butterfly operations of the subsequent computation stage.

Another aspect of the present invention provides an apparatus for performing an FFT computation, including: a memory unit for providing first and second input data elements in multiple memory areas; a butterfly block including a number of butterfly units, wherein the butterfly block is configured to, in each of a number of consecutive computation stages, perform multiple butterfly operations each based on a first input data element and a second input data element to obtain two output data elements, and wherein the memory unit is coupled with the butterfly block to simultaneously retrieve the first and second input data elements for a plurality of the multiple butterfly operations from predetermined memory locations of a first and second of the memory areas; and a memory mapping unit for storing, for each of the computation stages, the two output data elements into the memory unit as input data elements for a next computation stage according to a mapping scheme, wherein the mapping scheme is configured to store the output data elements at memory locations in the first and second memory areas, so that they are simultaneously retrievable as input data elements for a plurality of butterfly operations of the subsequent computation stage.

Another aspect of the present invention provides a computer program product for performing a FFT computation, the computer program product including a computer readable storage medium having program instructions embodied therewith, the program instructions readable by a computer to cause the computer to perform a method including: providing first and second input data elements in multiple memory areas of a memory unit; in each of a number of consecutive computation stages, performing multiple butterfly operations, each based on a first input data element and a second input data element, to obtain two output data elements, wherein the first and second input data elements for a plurality of the multiple butterfly operations are each simultaneously retrieved from predetermined memory locations of a first and second memory areas of the memory unit; and for each of the computation stages, storing the two output data elements in the memory unit as input data elements for a next computation stage according to a mapping scheme, wherein the mapping scheme is configured to store the output data elements at memory locations in the first and second memory areas, so that they are simultaneously retrievable as input data elements for a plurality of butterfly operations of the subsequent computation stage.

BRIEF DESCRIPTION OF THE DRAWINGS

Preferred embodiments of the present invention are described in more detail in conjunction with the accompanying drawings, in which:

FIG. 3 illustrates the distribution of the initial input data elements and the twiddle factors in memory lines of the memory unit.

FIG. 4 illustrates the generation of the memory line addresses for storing the data elements after removal of the $\log_2(p)$ least significant bits.

FIGS. 7a-7c illustrate an example for the input data element and twiddle factor combinations.

FIG. 8 illustrates the distribution of the output data elements of the last stage of the FFT computation in the memory lines.

DETAILED DESCRIPTION OF THE PREFERRED EMBODIMENTS

Figure 1:
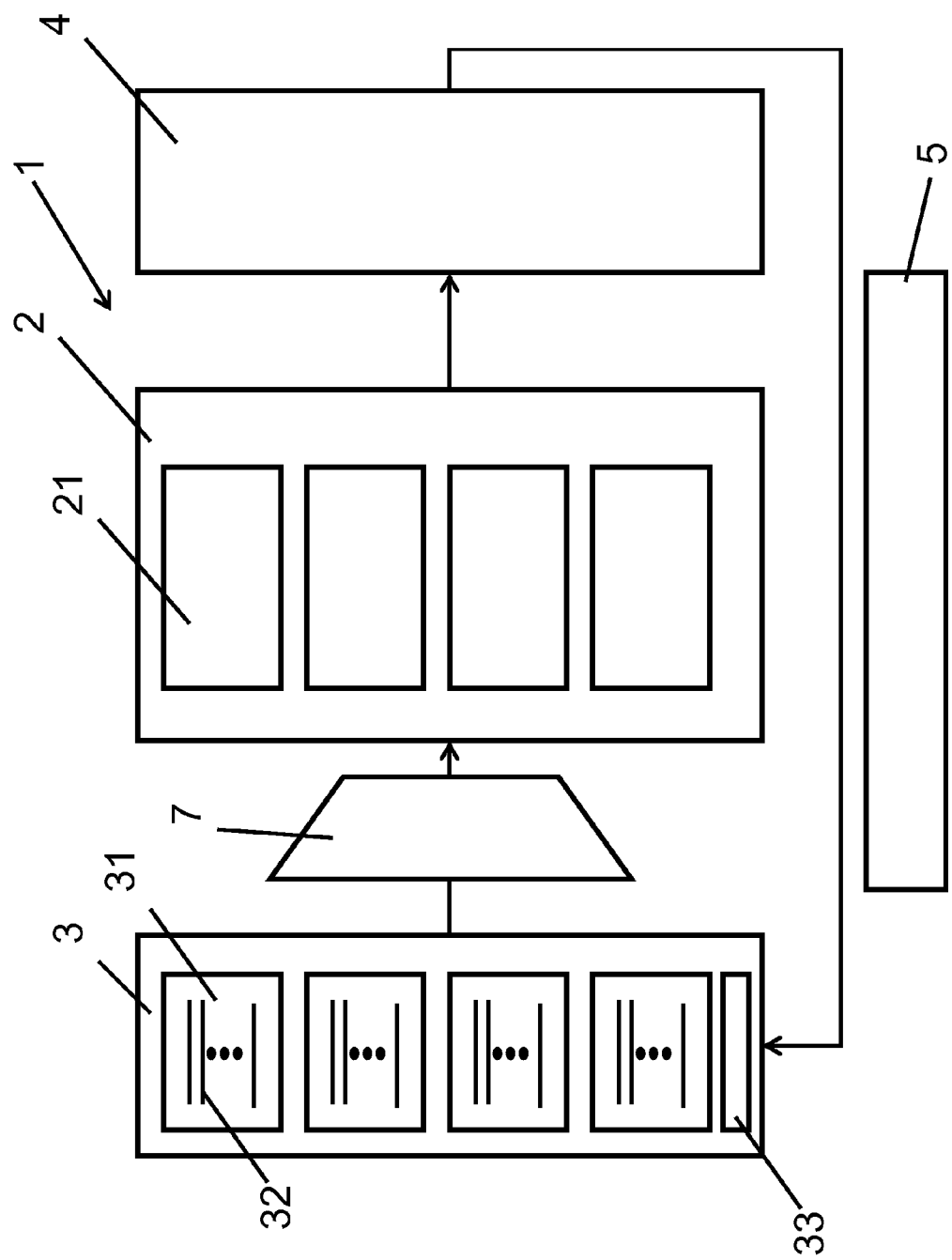
FIG. 1 shows a block diagram indicating an FFT computation system using a parallel butterfly block having multiple butterfly units.

According to an embodiment of a first aspect a method for performing a FFT computation is provided, including: providing first and second input data elements in multiple memory areas of a memory unit; in each of a number of consecutive computation stages, performing multiple butterfly operations each based on one first input data element and one second input data element to obtain two output data elements, wherein first and second input data elements for a plurality of the multiple butterfly operations are each simultaneously retrieved from predetermined memory locations of a first and a second of the memory areas of the memory unit; for each of the computation stages, storing the two output data elements in the memory unit as input data elements for a next computation stage according to a mapping scheme, wherein the mapping scheme is configured to store the output data elements at memory locations in the first and second memory areas, so that they are simultaneously retrievable as input data elements for a plurality of butterfly operations of the subsequent computation stage.

It is one idea of embodiments of the present invention to use the characteristics of an FFT application with the advantages of parallel memory accesses as achieved by using multiple memory banks and/or accessing a wide memory line. This can generally allow to enhance the overall performance of the FFT application. An important aspect for an effective use of the memory is to retrieve the input data to be processed as quickly as possible, e. g. to use as few memory lines as possible and to distribute the memory lines to be accessed to as many memory banks as possible since data in one memory line and data in different memory banks can be accessed simultaneously.

The FFT operation according to embodiments of the present invention includes a number of common butterfly operations which are processed simultaneously or almost simultaneously in subsequent stages, wherein in one stage each two input data elements are butterfly-operated while the output data elements resulting from the butterfly operation are stored at memory positions which are selected according to a memory mapping scheme in order to obtain the input data for a subsequent stage of butterfly operations as quickly as possible, e. g. from as few memory lines as possible. This can allow for the efficient use of a wide range of memory units storing multiple input data elements in one memory line, wherein the memory units can be accessed such that they are provided simultaneously to the respective butterfly operations in the respective stage.

According to methods embodying the present invention, the full FFT operation can, in particular, be performed in two phases. In the first phase, a straightforward readout of memory locations to obtain the input data elements for the respective stage of the first phase is carried out and the butterfly operations are performed using the readout input data elements. The resulting output data elements are stored in the same memory locations as those from which the input data elements have been obtained. In a second phase, the input data elements are retrieved, the butterfly operations of the respective stages are performed and the resulting output data elements are written into memory locations that are different from the memory locations from which the input data elements have been obtained.

By performing the butterfly operations using input data elements from different memory lines of different memory banks or from one single memory line, the input data elements can be provided simultaneously to the butterfly operations, thereby increasing the overall speed of computation.

Furthermore, the first and second memory areas can correspond to a first and a second memory line, respectively, wherein the memory unit is configured so that the memory locations of each memory line for storing the input data elements are simultaneously accessible.

It can be provided that the number of input data elements to be stored in each of the memory lines is one half of the number of input data elements initially provided.

Furthermore, the input data elements can be retrieved from two memory locations in different memory banks, wherein the memory banks are simultaneously accessible.

One or more computation stages can be associated with a first phase and one or more subsequent computation stages are associated with a second phase, wherein according to the mapping scheme for each of butterfly operation of each of the stages of the first phase the two output data elements resulting from the respective butterfly operation are stored into the same memory locations in the first and second memory areas as the ones from which the input data elements of the respective butterfly operation have been retrieved.

Moreover, for each of the butterfly operations of any of the stages first and a second input data elements can be computed which are respectively retrieved from first and second memory areas.

According to a further embodiment, for each of the butterfly operations of any of the stages of the second phase a first and a second input data element are retrieved from the first and the second memory area, wherein according to the mapping scheme for each of the butterfly operations of each of the stages of the second phase the input data elements input to the respective butterfly operations can be retrieved from memory locations of the first and second memory areas that are different from the memory locations in which the two output data elements resulting from the respective butterfly operation are stored.

Furthermore, it can be provided that for each of the butterfly operations of any of the stages of the second phase a first and a second input data element are respectively retrieved from the first and the second memory areas.

For each of the butterfly operations of any of the stages of the first phase a first and a second input data element can be respectively retrieved from first and second memory areas from memory locations having the same address offset in the respective memory line.

The memory areas can correspond to memory lines which can be located in different memory banks.

Performing multiple butterfly operations can be based on twiddle factors, wherein for each stage a specific set of twiddle factors is needed, wherein the twiddle factors are stored in a twiddle factor memory area, so that for each stage of multiple butterfly operations the number of memory accesses on the twiddle factor memory area which is needed to obtain the needed twiddle factors for the butterfly operations of the respective stage is minimized.

According to an embodiment of a further aspect of the present invention, an apparatus for performing an FFT computation is provided, including: a memory unit for providing first and second input data elements in multiple memory areas; a butterfly block including a number of butterfly units, where in the butterfly block is configured to, in each of a number of consecutive computation stages, perform multiple butterfly operations each based on one first input data element and one second input data element to obtain two output data elements, wherein the memory unit is coupled with the butterfly block to simultaneously retrieve first and second input data elements for a plurality of the multiple butterfly operations from predetermined memory locations of a first and a second of the memory areas; a memory mapping unit for storing, for each of the computation stages, the two output data elements into the memory unit as the input data elements for a next computation stage according to a mapping scheme, wherein the mapping scheme is configured to store the output data elements at memory locations in the first and second memory areas, so that they are simultaneously retrievable as input data elements for a plurality of butterfly operations of the subsequent computation stage.

FIG. 1 schematically shows a block diagram of an FFT computation system 1 using conventional butterfly operations to perform an FFT operation. The butterfly operations are carried out in a butterfly block 2 having one or more butterfly units 21 to be operated in parallel. The number of butterfly units 21 in the butterfly block 2 is substantially freely selectable; however, using several butterfly units 21 in parallel significantly increases the speed of the FFT computation. Each butterfly unit 21 receives two input data elements (IDE) from a memory unit 3 via a multiplexer 7 and provides two output data elements (ODE) as a processing result.

In case the number of butterfly operations to be calculated in one stage is larger than the number of butterfly units 21 available, the butterfly block 2 can further be adapted to pipeline input data elements obtained from the memory unit 3 to subsequently carry out the required butterfly operations efficiently using the butterfly units 21.

The memory unit 3 can include multiple memory banks 31, each including a number of memory lines 32 that are configured to store multiple samples as the FFT input data and/or twiddle factors required for the FFT operation. For instance, the memory lines 32 can have a width of 1024 bits, 2048 bits or the like. The memory unit 3 can have a memory controller 33 that is configured to simultaneously access data stored in one memory line 32 and to supply the respective memory data as input data elements to the butterfly block 2 in parallel. Additionally, memory lines 32 in different memory banks 31 can be accessed simultaneously, i. e. retrieving input data elements and/or twiddle factors from the memory unit 3 or writing resulting butterfly operation output data elements into the memory unit 3 can be carried out in parallel if memory lines of different memory banks 31 are being accessed. Hence, an essential amount of communication time for accessing the memory unit 3 can be saved.

The retrieval of the first and second input data elements is carried out by means of the multiplexer 7 which can be controlled by the control unit 5. The multiplexer 7 decides the memory line address of the memory lines 32 to be accessed and for each of the input data element the respective memory location address within the accessed memory lines 32.

Furthermore, a memory mapping unit 4 is provided which is configured to receive the resulting butterfly operation output data elements and to direct them back to a memory address of the memory unit 3 according to a mapping scheme as described in more detail below.

Furthermore, a control unit 5 is provided which controls the process for performing an FFT computation in a number of consecutive stages by controlling the retrieval of input data elements for the butterfly operations and respective twiddle factors for each of the butterfly operations required and for writing back the butterfly operation results as output data elements in memory locations, the addresses of which are determined by the memory mapping unit 4.

Figure 2:
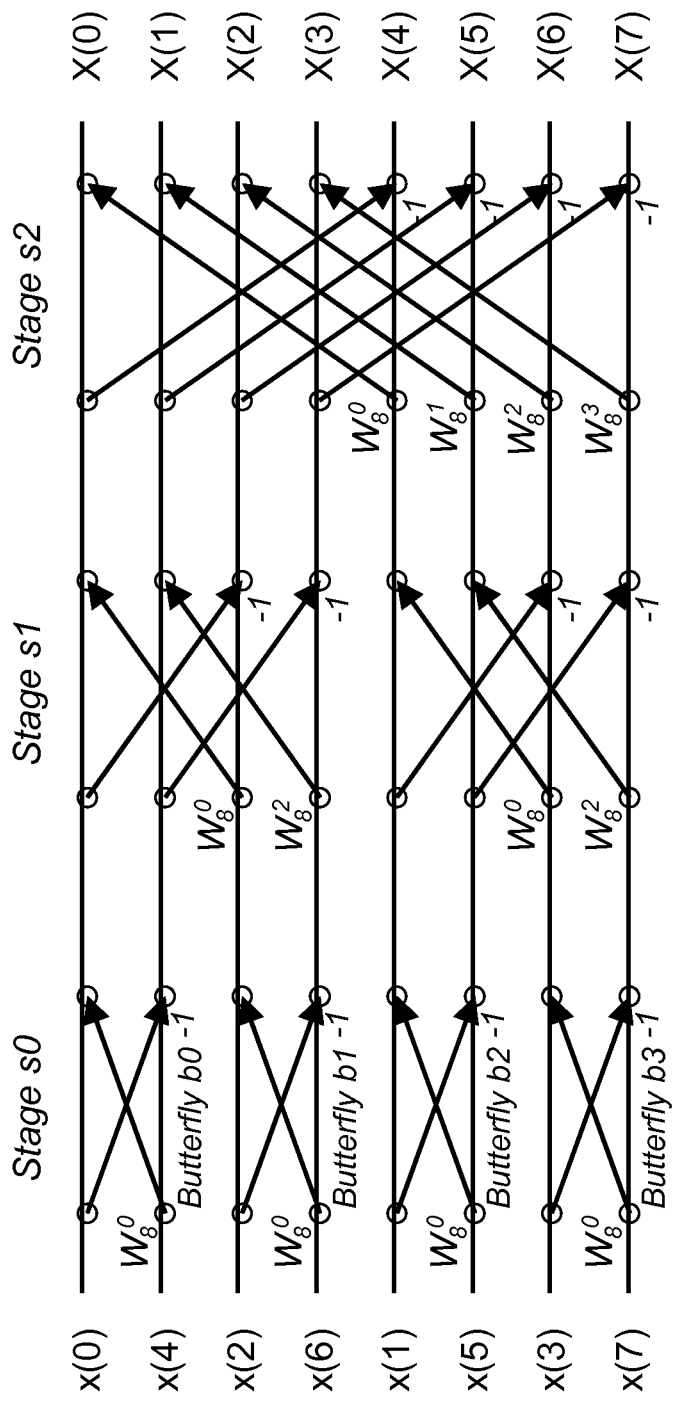
FIG. 2 shows a diagram illustrating the calculation scheme of a radix-2 8-point FFT operation.

In FIG. 2 a functional diagram showing the butterfly operations in multiple FFT stages is shown for an example of a radix-2 8-point FFT, which is configured to process a number of N=8 samples in a number of $\log_2(N)$, i. e. 3, FFT stages which are labeled from s0 to s2 the stage index being s. The number of butterfly operations per stage equals N/2, so that the number of butterfly operations to be performed in each stage equals 4. The butterfly operations of one stage are labeled b with an index b=0 to N/2−1.

The twiddle factors TF are indicated as $W_N^0$, $W_N^1$, ..., $W_N^{N/2-1}$. According to the FFT computation, only one of the twiddle factors TF is used for the first stage s0, while for the last stage all twiddle factors TF are used. The samples providing the initial input data to be transformed are indicated by x(0), x(1), . . . , x(N−1). The samples x(0), x(1), . . . , x(N−1) and the twiddle factors TF are provided as complex numbers. The twiddle factors TF are calculated as $W_N^k = e^{-j(2\pi k/N)}$ with $0 \le k \le N/2-1$.

As indicated in FIG. 2, each butterfly operation receives two input data elements $i_0$, $i_1$ and one twiddle factor TF and outputs two resulting output data elements $r_0$, $r_1$ as follows:

$$r_0 = i_0 + TF \cdot i_1$$

$$r_1 = i_0 - TF \cdot i_1$$

The data samples as initial input data elements for the first stage s0, the input data elements for the other stages and the twiddle factors TF are stored in the memory unit 3 with a total of p consecutive data elements and/or twiddle factors TF, respectively, stored in each memory line 32. For example, the tables shown in FIG. 3 for an 32-point FFT (N=32) illustrate the distribution of the initial input data elements and the twiddle factors TF in memory lines 32 in the memory unit 3, where each memory line 32 is configured to store four (p=4) input data elements and/or four (p=4) twiddle factors TF, respectively. Data in the memory is addressed by a memory line address and an address offset to indicate the respective data element in the memory line 32.

At the beginning of the FFT computation, each block of p consecutive input data elements as input samples is stored at a memory line address that is obtained by taking the bit-reversed value of the index of the data element after removal of the $\log_2(p)$ least significant bits, as is illustrated in FIG. 4.

Furthermore, each block of p consecutive twiddle factors TF is stored at a memory line address that equals the twiddle factor index after removal of the $\log_2(p)$ least significant bits, i. e. the total number of twiddle factor memory line addresses equals N/2/p and the width of the twiddle factor line address is $\log_2(N/(2p))$ bits.

In general, the FFT calculation involves a total of $\log_2(N)$ stages, with a total of N/2 butterflies being calculated in each stage. In this process, two input data memory lines 32 are first read from the memory unit 3 (containing a total of 2p input data elements) and one twiddle factor memory line 32 (containing a total of p twiddle factors). Next, p butterflies are calculated on the available input data elements (each butterfly processes a different combination of two input samples from the given memory line 32) and use the available twiddle factors. The results of the p butterfly calculations, including a total of 2p result values (with 2 resulting output data elements per butterfly operation) mapped on two memory lines 32, are written back to the memory system at the original memory line addresses from which the input data elements were read.

Generally, the memory line addresses as used herein represent a memory line address offset to be added to a base memory line address to be pre-selected. The two input data memory line addresses involved in the reading and writing steps and the twiddle factor memory line address are calculated in the following way for a given butterfly b with a butterfly block index of b=0 to N/2−1 and at a given stage s with a stage index of s=0 to $\log_2(N)-1$ as follows. The input data memory line address width is $w=\log_2(N/p)$; the twiddle factor memory line address width $w_t = w-1$.

For each butterfly operation the first input data memory line address for the first input data $i_0$ is:

2·b rol s and the second input data memory line address for the second input data $i_1$ is:

(2·b+1) rol s wherein rol s is a rotate-left bit operation of s bits where s is the index number of the respective stage s.

The twiddle factor memory line addresses are generated using a mask having a width equal to $w_t$. The mask is generated by shifting 0b by the stage index number of bits to the right inserting "ones" at the left side. For example, in a system configured with N=32, p=4 and $w_t=2$ the masks are as follows:

00b (stage s0), 10 b (stage s1), 11b (stages s2 and further stages)

For example in a system configured with N=1024, p=8 and $w_t=6$ the masks are as follows:

000000b (stage s0), 100000b (s1), 110000b (s2), 111000b (s3), 111100b (s4), 111110b (s5), 111111b (stages s6 and further stages)

The twiddle factor memory line address then corresponds to an AND operation between the index number of the butterfly operation and the mask as calculated above.

The FFT computation is performed in two phases each having one or more stages. The transition between the first and second phase is dependent on the number N of initial input data elements (samples) and the number p of input data elements and/or twiddle factor data elements which can be stored in one single memory line 32: typically, the first phase includes $\log_2(N/p)$ stages and the second phase includes $\log_2(p)$ stages. For instance, in the case of a 16-point FFT with 4 butterfly operation stages, the first phase includes a first set of two butterfly operation stages s0, s1 and the second phase includes the last two butterfly operation stages s2, s3.

Generally, the first phase is straightforward, i. e. for each stage of the first phase pairs of memory lines 32 are loaded each memory line 32 providing a number of p input data elements of p corresponding memory locations. Based on the input data elements loaded from one or more pairs of memory lines 32, k=N/2 butterfly operations are computed. The resulting output data elements are stored in the same memory locations of the two loaded memory lines 32 from which the respective input data elements have been loaded, i.e. in the memory locations indicated by same memory line addresses and the same address offsets (indicating the position of the input data element within the respective memory line) as the input data was retrieved before.

In the second phase, the memory lines 32 are still loaded in pairs after which it is then possible to compute butterfly operations using as input data elements the ones as indicated by the memory line address calculation as given above, i. e. 2b rol s and (2b+1) rol s. As explained above, the input data element address offset within a given memory line indicates the address of the memory location within a given memory line containing p samples. The same is true for the twiddle factor address offset which indicates within a given twiddle factor memory line the address of the memory location within a given twiddle factor memory line containing p samples.

However, in this second phase, according to the mapping scheme the output data elements are not written back into the same memory location the input data elements have been stored in. This is because the input data combinations for each butterfly unit 21 are chosen differently compared to the scheme of the first phase. While the memory lines 32 of the input data elements are maintained for the output data elements to be written, a permutation occurs within the memory lines 32. For instance, for the exemplary 16-point FFT in the third stage, i. e. the first stage of the second phase, two input samples are obtained from one single memory line 32. The outputs of the butterfly operations are distributed over both memory lines 32.

Figure 5:
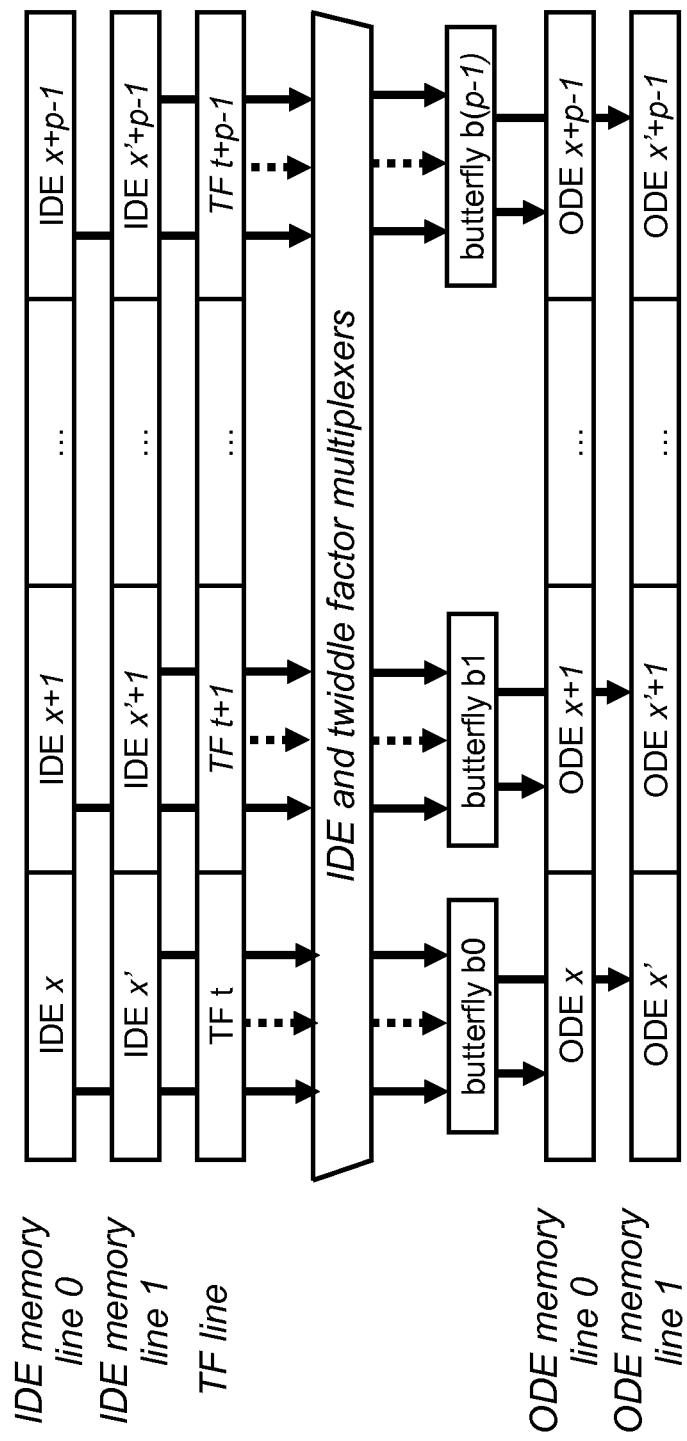
FIG. 5 shows a diagram illustrating the operation of the butterfly units in a first phase of processing.

This is more clearly indicated in FIG. 5. A total of k butterfly operations are calculated over two input data memory lines 32 and one twiddle factor memory line 32 that were read from the memory unit 3. The input of each butterfly operation is selected using the multiplexer 7 based on the stage index s and the butterfly index b. The output data of each butterfly operation is written as described above, i. e. the first butterfly operation results are stored as a set of first entries in the two memory lines 32 and the second butterfly operation results are stored as a set of second entries in the memory lines 32, etc.

Figure 6:
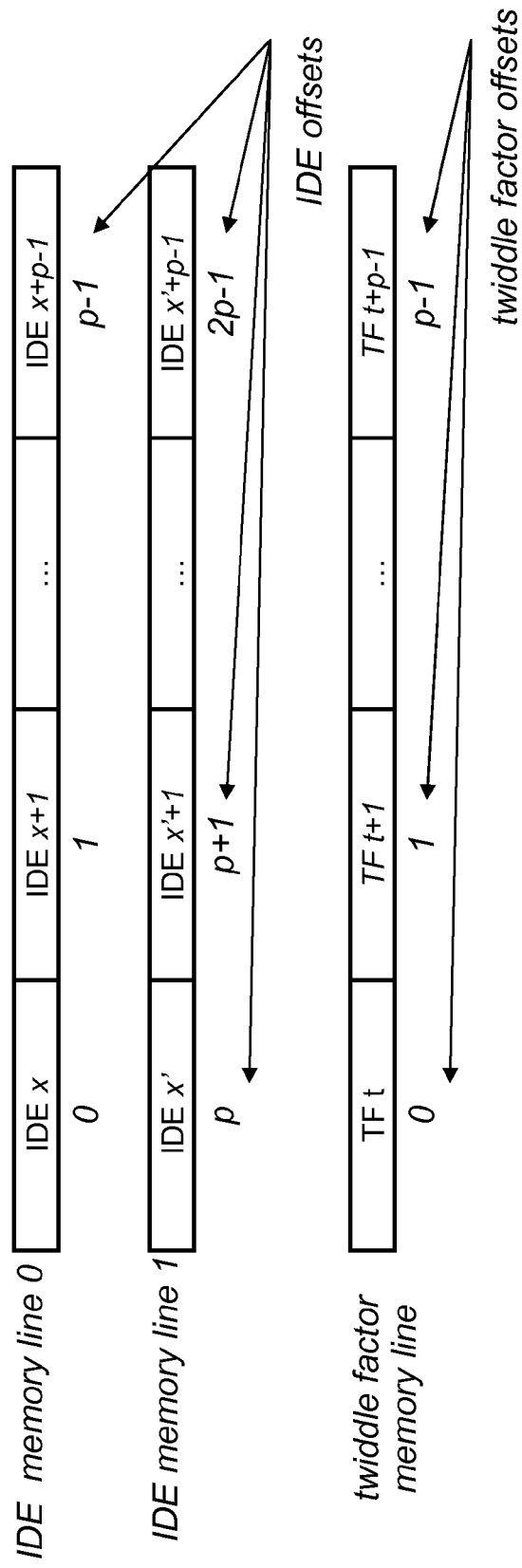
FIG. 6 schematically illustrates the address offsets indicating the memory location of the input data element and the twiddle factors in their respective memory lines.

A set of multiplexers is used to respectively select the two input data elements and the corresponding twiddle factor TF that are used as input for each of the p butterfly calculations. The memory location of each input data element and twiddle factor in the two input data element memory lines 32 and in the twiddle factor memory lines, respectively, are identified using an input data element address offset and twiddle factor address offset, respectively. The offsets are defined/shown in FIG. 6.

According to the index b of the butterfly operations performed by the butterfly unit 21, the memory location from which the input data is obtained is indicated by a memory address offset for each memory line 32.

Based on the definitions of the address offsets of the input data elements and twiddle factor data elements within the memory lines 32, the input data elements and twiddle factor data elements are selected for a given butterfly operation b within a butterfly block 2 including k butterfly units 21 at stage s that processes two input data memory lines 32 and one twiddle factor memory line 32. It is further defined:

$$pos=\min(\log_2(N)-s-1, \log_2(p))$$

with the min operator returning the minimum value: either $\log_2(N)-s-1$ or $\log_2(p)$.

For the example: N=32, p=4 it follows:
pos=2 (for stages s0, s1, s2), pos=1 (for stage s3), pos=0 (for stage s4).

The input data element address offsets of the input data elements to butterfly b within the butterfly block 2 at stage s are:
Input data element address offset_0=insertBit(b, pos, 0)
Input data element address offset_1=insertBit(b, pos, 1)
with the insertBit(b, pos, x) function inserting a bit x into butterfly index b at position pos.

The twiddle factor address offset of the twiddle factor element used by butterfly b within the butterfly block 2 at stage s is calculated in the following way:
mask=0 shifted by pos bits to the right inserting "ones" at the left side (mask width equal to $\log_2(p)$ bits
twiddle factor address offset=b and mask (and being a bitwise and operation)

The example: N=32, p=4 results in:
mask=00b (for stages s0, s1, s2), 10b (for stage s3), 11b (for stage s4)
[pos=2 (for stages s0, s1, s2), pos=1 (for stage s3), pos=0 (for stage s4)]

Figure 7A:
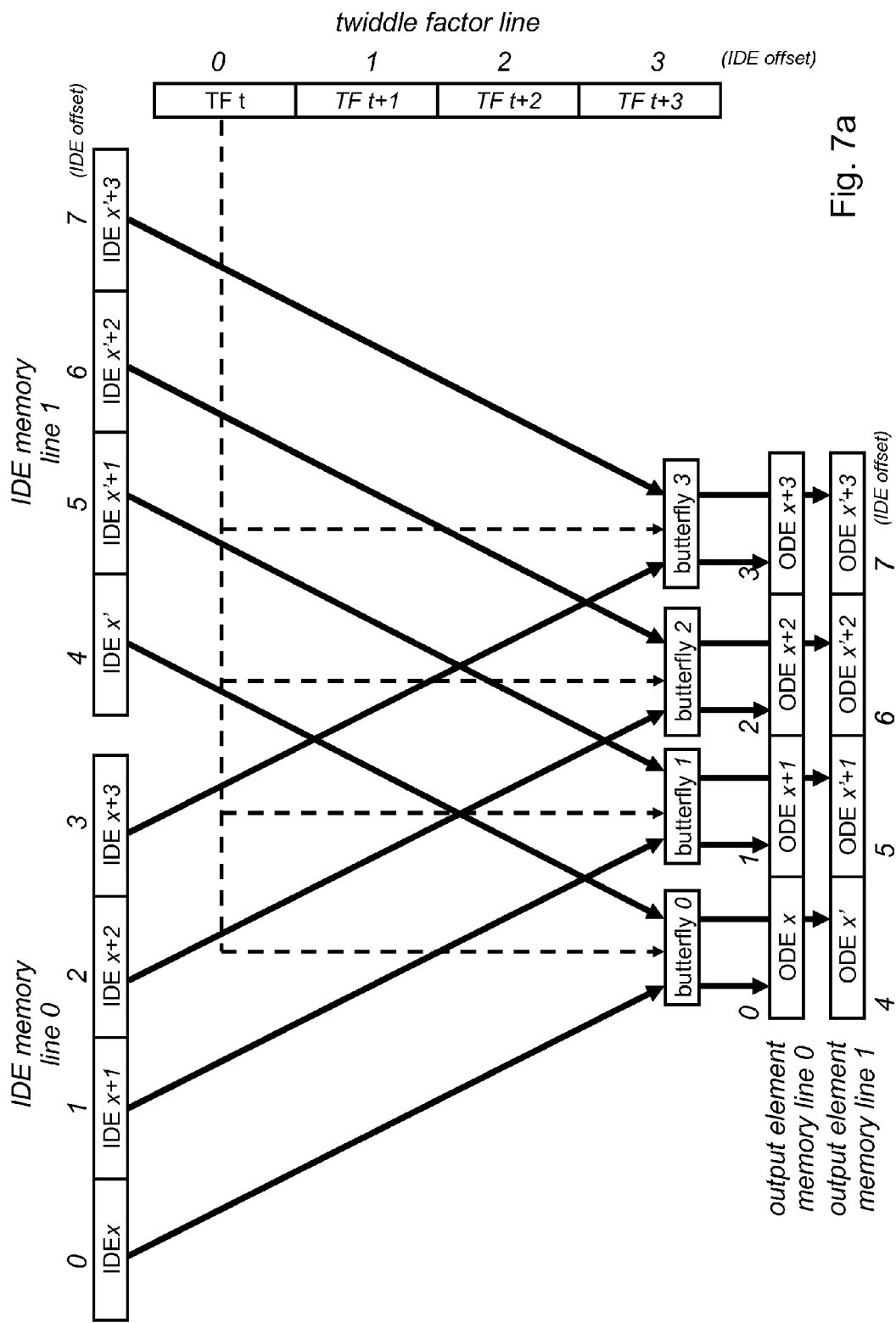
Figure 7C:
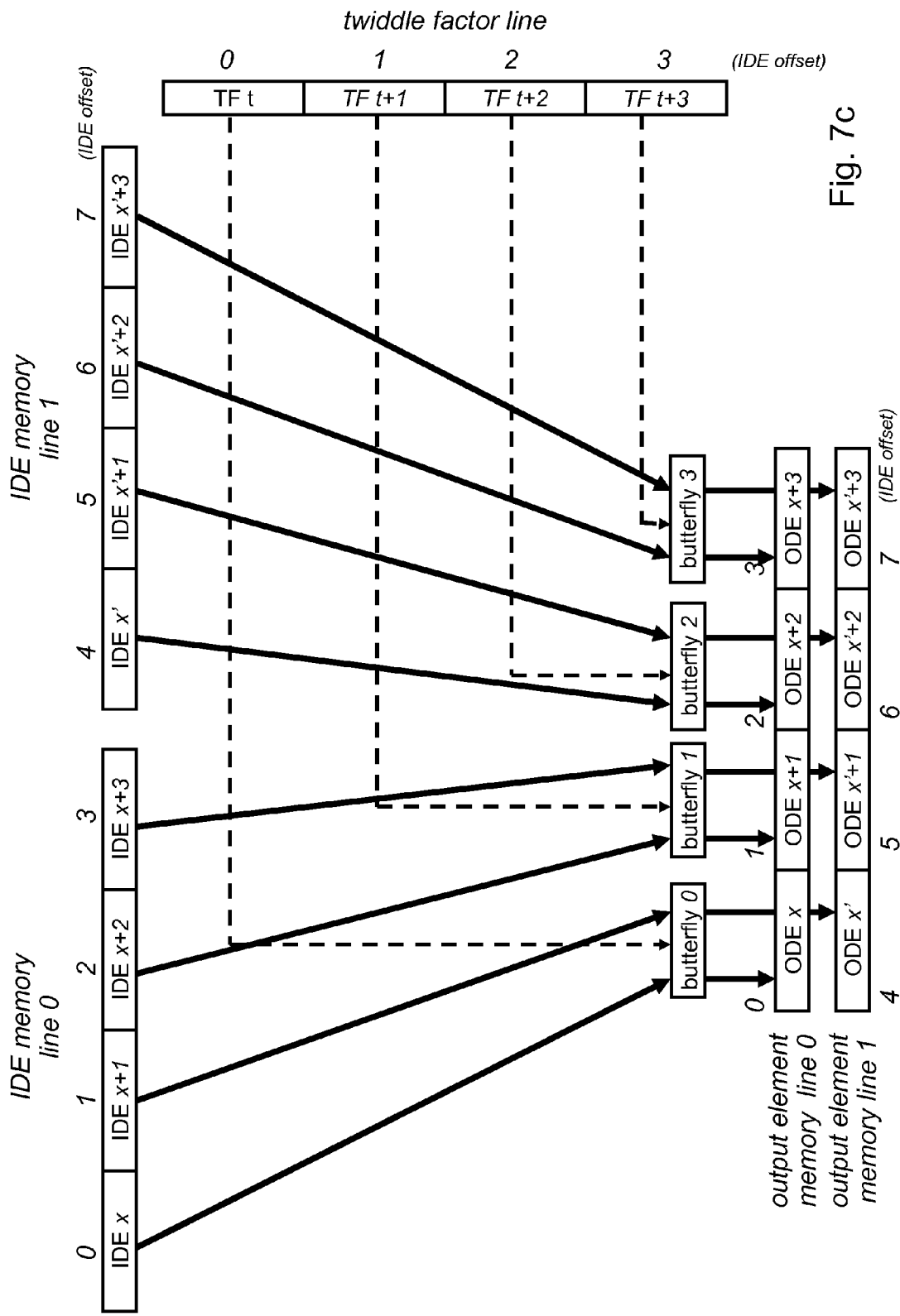

In FIGS. 7a-7c an example for the input data element and twiddle factor combinations is illustrated for an example of a 32-point FFT (N=32) and a memory system storing p=4 samples in each input data element memory line (and p=4 twiddle factors in each twiddle factor memory line). FIG. 7a shows the combination for stages s0, s1, s2, FIG. 7b the combination for stage s3, and FIG. 7c the combination for stage s4. It can be seen that the above equations result in the following input data element offset and twiddle factor offset combinations for each of the p=4 butterfly combinations that are performed for each combination of two input data element memory lines and one twiddle factor memory line:

In stages s0, s1, and s2:
butterfly calculation b0: input data element address offset 0, input data element address offset 4, twiddle factor offset 0
butterfly calculation b1: input data element address offset 1, input data element address offset 5, twiddle factor offset 0
butterfly calculation b2: input data element address offset 2, input data element address offset 6, twiddle factor offset 0
butterfly calculation b3: input data element address offset 3, input data element address offset 7, twiddle factor offset 0

In stage s3:
butterfly calculation b0: input data element address offset 0, input data element address offset 2, twiddle factor offset 0
butterfly calculation b1: input data element address offset 1, input data element address offset 3, twiddle factor offset 0
butterfly calculation b2: input data element address offset 4, input data element address offset 6, twiddle factor offset 2 butterfly calculation b3: input data element address offset 5, input data element address offset 7, twiddle factor offset 2

In stage s4:
butterfly calculation b0: input data element address offset 0, input data element address offset 1, twiddle factor offset 0
butterfly calculation b1: input data element address offset 2, input data element address offset 3, twiddle factor offset 1
butterfly calculation b2: input data element address offset 4, input data element address offset 5, twiddle factor offset 2
butterfly calculation b3: input data element address offset 6, input data element address offset 7, twiddle factor offset 3

For the given example of N=32-point FFT with preferably p=4 input data elements per memory line 32, the output data elements of the last stage of the FFT computation are as shown in the table of FIG. 8. In order to retrieve the output data in the correct order, the stored output data memory line 32 needs to be retrieved based on a memory line address that is incremented from 0 to 7, followed by a left rotation by z bits, with $z=\log_2(p) \mod \log_2(N/p)$.

Figure 9:
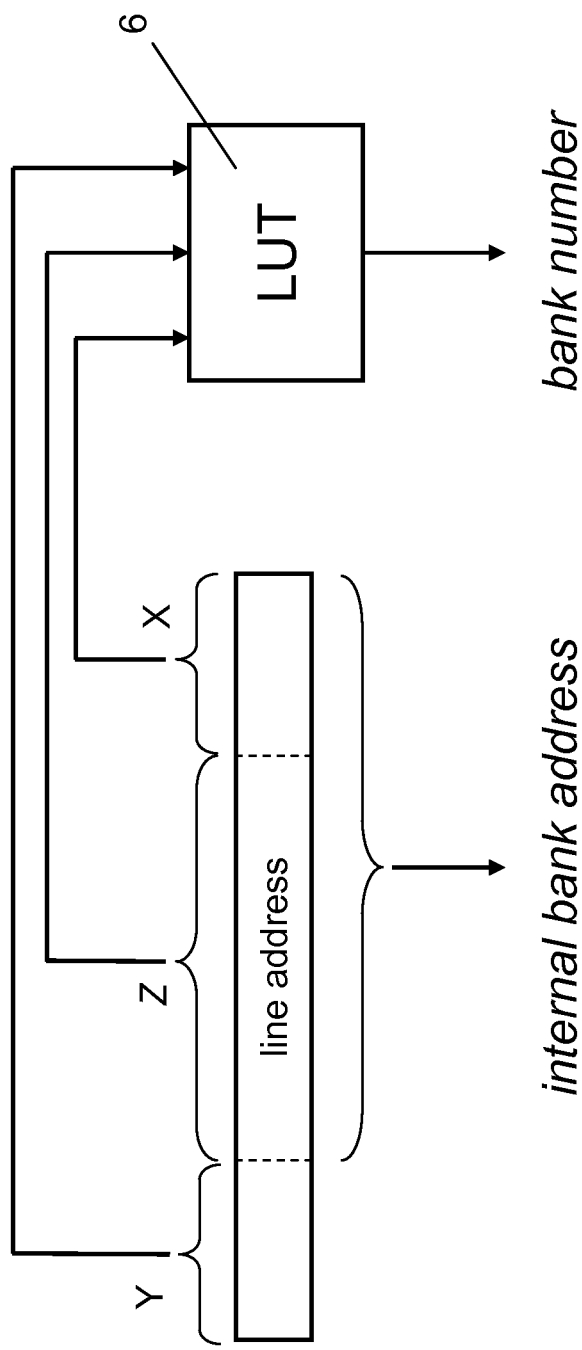
FIG. 9 shows a block diagram illustrating an address mapping scheme for reading out transformation results.

If the memory unit 3 has multiple memory banks 31, a memory bank mapping can also be applied. As shown in FIG. 9, portions of the memory line address are used in a lookup table (LUT) 6 in order to generate the index number of memory banks 31 to be addressed. The memory bank number is obtained by indexing a lookup table using three values extracted from the memory line address. A first portion X and a second portion Y cover disjoint portions of the memory line address, while the sum of the sizes of X and Y needs to be at least equal to $\log_2(m)$. A third portion Z includes the remaining bits of the memory line address that are not part of X or Y. The X and Y portions together form the address used to access the memory bank that is selected by the memory bank number that is obtained as described above.

In general, the memory bank mapping is carried out according to the following rules:

two memory lines 32 are not located in the same memory bank 31 when the parity calculated over the Z portion of their memory line addresses is the same, but the Y portions are different; or two memory lines 32 cannot be located in the same memory bank 31 when the Y portions of their addresses are the same, but the parity calculated over the Z portions differ.

Figure 10:
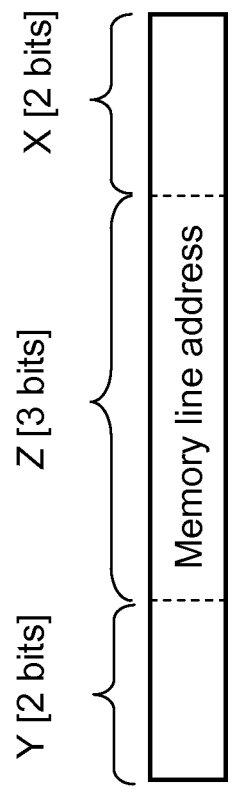
FIG. 10 illustrates the mapping of memory lines to multiple memory banks depending on a memory line address.

FIG. 10 illustrates the mapping of memory lines to multiple memory banks depending on a memory line address. The entry in the table corresponds to the bank number which is selected depending on the Y portion (rows) and the X portion (columns). Further, the tables are selected depending on the parity of the Z portion of the memory line address (left or right table). One can see that the bank addresses selected for different parities are never the same for the same X and Y portions of the memory line addresses By applying these rules it can be ensured that two memory lines 32 to be loaded according to the above computation scheme are never stored in the same memory bank 31.

Regarding the twiddle factor TF, an N-point FFT computation requires N/2 twiddle factors TF. In stage i, $2^i$ twiddle factors TF with stride $2^{\log_2 N - i - 1}$ are used. When the twiddle factors TF are also stored in k-wide memory lines 32, the final stage determines the mapping for the twiddle factors TF because in the final stage every butterfly operation requires a different twiddle factor TF.

One of the advantages of the permutation performed in the second phase of the butterfly operations is that due to the permutation the k butterfly operations performed on the pair of memory lines 32 require k consecutive twiddle factors TF. Resulting in a simple mapping of twiddle factors TF to memory lines 32, memory line n stores twiddle factors TF n·k to (n+1) k.

What is claimed is:

1. A method for performing a FFT computation, comprising:
providing first and second input data elements in multiple memory areas of a memory unit;
in each of a number of consecutive computation stages, simultaneously performing multiple butterfly operations by at least one computer processor, each based on a first input data element and a second input data element, to obtain two output data elements, wherein the first and second input data elements for a plurality of the multiple butterfly operations are each simultaneously retrieved from predetermined memory locations of a first and second memory areas of the memory unit, and wherein one or more computation stages are associated with a first phase and one or more subsequent computation stages are associated with a second phase; and
for each of the computation stages, storing the two output data elements in the memory unit as input data elements for a next computation stage according to a mapping scheme, wherein the mapping scheme is configured to store the output data elements at memory locations in the first and second memory areas so that they are simultaneously retrievable as input data elements for a plurality of butterfly operations of the subsequent computation stage;
wherein, according to the mapping scheme for each of the butterfly operation of each of the computation stages of the first phase, the two output data elements resulting from the respective butterfly operation are stored into the same memory locations in the first and second memory areas as the input data elements of the respective butterfly operation which have been retrieved; and
wherein, according to the mapping scheme for each of the butterfly operations of each of the computation stages of the second phase, the input data elements input to the respective butterfly operations are retrieved from memory locations of the first and second memory areas that are different from the memory locations in which the two output data elements resulting from the respective butterfly operation are stored.

2. The method according to claim 1, wherein the first and second memory areas correspond to first and second memory lines, respectively, wherein the memory unit is configured so that the memory locations of each memory line for storing the input data elements are simultaneously accessible.

3. The method according to claim 2, wherein a number of input data elements to be stored in each of the memory lines is one half of the number of the input data elements initially provided.

4. The method according to claim 1, wherein input data elements are retrieved from two memory locations in different memory banks, wherein the memory banks are simultaneously accessible.

5. The method according to claim 1, wherein for each of the butterfly operations of any of the computation stages of the first phase, a first and second input data element are computed which are respectively retrieved from a first and second memory area.

6. The method according to claim 1, wherein: for each of the butterfly operations of any of the computation stages of the second phase, a first and second input data element are retrieved from a first and second memory area.

7. The method according to claim 6, wherein:
for retrieving the input data elements, the memory areas are addressable by memory line addresses;
for each of the butterfly operations of each of the computation stages, the memory line address for the first input data element is 2·b rol s and the memory line address for the second input data element is (2·b+1) rol s;
b is an index number of a butterfly operation of a respective butterfly stage; and
s is an index number of the computation stage and rol is a rotate-left bit operation.

8. The method according to claim 7, wherein:
the memory locations are addressable within memory areas by address offsets;
the address offsets for the memory locations within each of the memory areas for storing the output data elements are obtained by: pos=min ($\log_2(N)-s-1$, $\log_2(p)$), with the min operator returning a minimum, N being the total number of initial input data elements, and p being the number of memory locations in each memory area; and
the address offset for the first input data element is determined by insertBit(b, pos, 0) and the address offset for the second input data element is determined by insertBit(b, pos, 1), with the insertBit(b, pos, x) function inserting a bit x into index number b of the butterfly operation at position pos.

9. The method according to claim 8, wherein:
for each of the butterfly operations of any of the computation stages a first and second output data element are respectively stored into memory locations of the first and second memory areas;
wherein the memory locations are addressed by the same address offsets in the respective memory area.

10. The method according to claim 1, wherein the memory areas correspond to memory lines located in different memory banks.

11. The method according to claim 10, wherein a memory bank address is derived from the address of a memory area using a parity function on a portion of the address of the memory area and a lookup table to associate the address of the memory area with a bank address with respect of a result of the parity function.

12. The method according to claim 1, wherein:
performing multiple butterfly operations is based on twiddle factors;
for each stage a specific set of twiddle factors is needed; and
the twiddle factors are stored in a twiddle factor memory area, so that for each stage of multiple butterfly operations the number of memory accesses on the twiddle factor memory area which is needed to obtain the needed twiddle factors for the butterfly operations of the respective stage is minimized.

13. An apparatus for performing an FFT computation, comprising:
a memory unit for providing first and second input data elements in multiple memory areas;
a butterfly block including a number of butterfly units, wherein the butterfly block is configured to, in each of a number of consecutive computation stages, simultaneously perform multiple butterfly operations each based on a first input data element and a second input data element to obtain two output data elements, and wherein the memory unit is coupled with the butterfly block to simultaneously retrieve the first and second input data elements for a plurality of the multiple butterfly operations from predetermined memory locations of a first and second of the memory areas; and
a memory mapping unit for storing, for each of the computation stages, the two output data elements into the memory unit as input data elements for a next computation stage according to a mapping scheme, wherein the mapping scheme is configured to store the output data elements at memory locations in the first and second memory areas so that they are simultaneously retrievable as input data elements for a plurality of butterfly operations of the subsequent computation stage;
wherein, according to the mapping scheme for each of the butterfly operation of each of the computation stages of the first phase, the two output data elements resulting from the respective butterfly operation are stored into the same memory locations in the first and second memory areas as the input data elements of the respective butterfly operation which have been retrieved; and
wherein, according to the mapping scheme for each of the butterfly operations of each of the computation stages of the second phase, the input data elements input to the respective butterfly operations are retrieved from memory locations of the first and second memory areas that are different from the memory locations in which the two output data elements resulting from the respective butterfly operation are stored.

14. A computer program product for performing a FFT computation, the computer program product comprising a non-transitory computer readable storage medium having program instructions embodied therewith, the program instructions readable by a computer to cause the computer to perform a method comprising:
providing first and second input data elements in multiple memory areas of a memory unit;
in each of a number of consecutive computation stages, simultaneously performing multiple butterfly operations by at least one computer processor, each based on a first input data element and a second input data element, to obtain two output data elements, wherein the first and second input data elements for a plurality of the multiple butterfly operations are each simultaneously retrieved from predetermined memory locations of a first and second memory areas of the memory unit; and
for each of the computation stages, storing the two output data elements in the memory unit as input data elements for a next computation stage according to a mapping scheme, wherein the mapping scheme is configured to store the output data elements at memory locations in the first and second memory areas, so that they are simultaneously retrievable as input data elements for a plurality of butterfly operations of the subsequent computation stage;
wherein, according to the mapping scheme for each of the butterfly operation of each of the computation stages of the first phase, the two output data elements resulting from the respective butterfly operation are stored into the same memory locations in the first and second memory areas as the input data elements of the respective butterfly operation which have been retrieved; and wherein, according to the mapping scheme for each of the butterfly operations of each of the computation stages of the second phase, the input data elements input to the respective butterfly operations are retrieved from memory locations of the first and second memory areas that are different from the memory locations in which the two output data elements resulting from the respective butterfly operation are stored.

\* \* \* \* \*